Oct. 20, 1959     C. H. KRAMER     2,908,988
FISHING LURE
Filed May 26, 1958

INVENTOR
CECIL H. KRAMER
BY Justan Miller
ATTORNEY 2,908,988
FISHING LURE

Cecil H. Kramer, Seward, Alaska

Application May 26, 1958, Serial No. 737,825

2 Claims. (Cl. 43—42.06)

This invention relates to fishing lures, and it particularly relates to fishing lures having a form which simulates bait such as herring or minnows.

It is one object of the present invention to provide a fishing lure of the above type which has a tendency to be substantially buoyant in water and which will be less apt to cause breakage or snapping of the line on sudden jerks or pressures.

Another object of the present invention is to provide a fishing lure of the above type which will have a tendency to remain right side up on slow trolling or casting.

Another object of the present invention is to provide a fishing lure of the above type which will give the appearance of swimming bait and which will direct attention thereto while in the water.

Other objects of the present invention are to provide an improved fishing lure, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawing in which.

Figure 1:
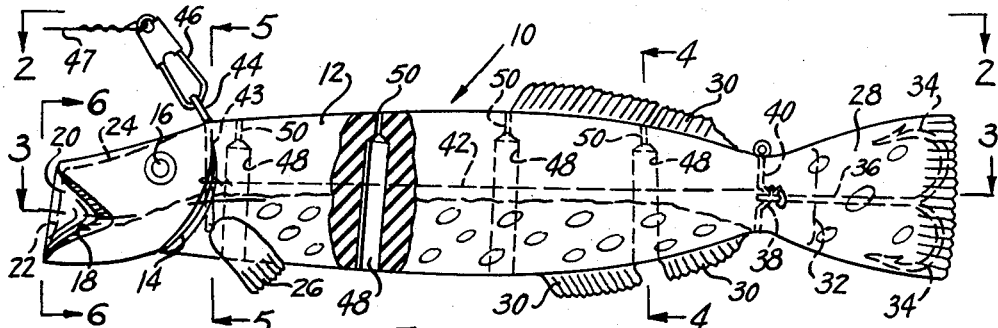
Fig. 1 is a side view, partly in elevation and partly in section, of a fishing lure embodying the present invention.
Figure 2:
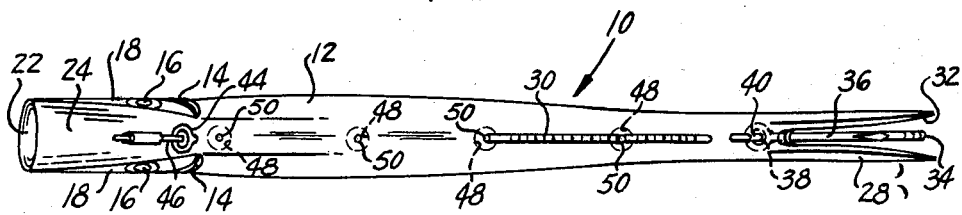
Fig. 2 is a top plan view taken on line 2—2 of Fig. 1.

Referring now in greater detail to the drawing wherein similar reference characters refer to similar parts, there is shown a fishing lure, generally designated 10, which comprises a body portion 12 of generally streamlined and fish-like appearance, and which is constructed of a resilient or flexible material such as rubber, polyethylene or similar synthetic or natural plastic materials.

At the fore part of the body 12 is provided a head portion including a groove 14 at each side simulating gills, painted eyes 16 and a mouth defined by depressions 18 on each side. Within the mouth is a plug portion 20 having a concavity 22 at its forward end. On the nose, above the mouth, there is also provided a slight, outwardly and forwardly extending concavity 24.

Just behind the gills 14, at each lower side of the body 12, there are provided fins 26 while at the rear end, the body 12 is provided with a tail 28. Adjacent the tail 28 are simulated fins 30 at top and bottom.

The tail 28 is split longitudinally to provide a rearwardly-opening slot 32. In this slot 32 is provided a fish hook 34 with its barbs facing forwardly and with its stem 36 pivotally connected, as at 38, to a steel or brass pin 40 having a central offset portion at its pivotal connection with the hook stem 36. The pin 40 is fixed transversely through the rear portion of the body 12 adjacent the tail 28 (as best shown in Fig. 1). The stem 36 of the hook is connected by a steel wire 42 to the stem 43 of an eyelet 44 projecting above the head. To this eyelet 44 is adapted to be secured the catch 46 of a fishing line 47.

Figure 3:
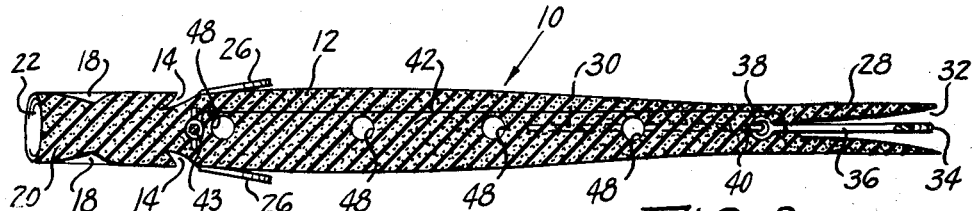
Fig. 3 is a sectional view taken on line 3—3 of Fig. 1.
Figure 4:
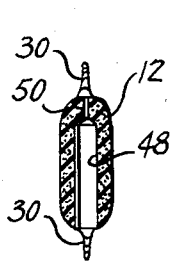
Fig. 4 is a sectional view taken on line 4—4 of Fig. 1.
Figure 5:
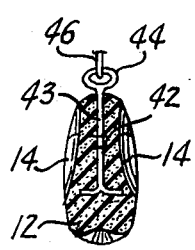
Fig. 5 is a sectional view taken on line 5—5 of Fig. 1.
Figure 6:
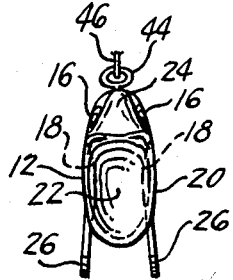
Fig. 6 is a front view taken on line 6—6 of Fig. 1.

Spaced from each other longitudinally of the body 12 are a series of transverse bores 48 which extend from the bottom of the body 12 almost through to the top but which are provided with reduced extensions 50 at the top. The wire 42 extends along one side of these bores (as best seen in Fig. 3).

The device is preferably colored to simulate a herring or minnow as closely as possible. The plug portion 20 in the mouth as well as the gills 14 are painted a bright red while the fins and tail have a few red spots.

While in the water, the depressions 22 and 24 on the plug portion 20 and on the nose respectively, act to give the lure a downward and sideward movement while the red gills look like they are working.

The flexible construction of the device provides so much resilience that even a hard jerk on the line will not generally break it because much of the sudden force is assimilated by the flexible lure. This flexibility is increased by the bores 48. Furthermore the construction of these bores, whereby they are of relatively large diameter on the bottom and are provided with narrow portions 50 on top, tend to keep the lure right side up on slow trolling or casting. In addition, when casting, air bubbles will leave the lure to attract attention.

The fins and tail are very thin and flexible while the provision of the hook 34 within the slot 32 in the tail protect the hook sufficiently to enable one to troll or cast in weeds or rocks.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A fishing lure comprising a flexible body of simulated bait appearance, said body having a head portion and a tail portion, a rearwardly-opening vertical slot in said tail portion forming relatively thin side walls, a fish hook completely encased in said slot between said thin side walls, a retaining pin in said body, a stem on said hook pivotally connected to said pin, and a series of transverse bores extending from top to bottom of said body.

2. The fishing lure of claim 1 wherein the major portion of each of said bores is vertical relative to the body and is of relatively large diameter and has a bottom opening equal to said diameter and wherein a minor portion thereof, adjacent the top of the body, is of relatively small diameter.

References Cited in the file of this patent

UNITED STATES PATENTS

| | | |
|---|---|---|
| 1,540,702 | Morriss | June 2, 1925 |
| 1,599,763 | Head | Sept. 14, 1926 |
| 1,786,568 | Kutz | Dec. 30, 1930 |
| 2,148,784 | Stewart et al. | Feb. 28, 1939 |
| 2,183,816 | Lovelace | Dec. 19, 1939 |
| 2,317,781 | Lehto | Apr. 27, 1943 |
| 2,467,244 | Van Hee et al. | Apr. 12, 1949 |
| 2,546,516 | Nardi | Mar. 27, 1951 |
| 2,556,683 | Dietz | June 12, 1951 |
| 2,590,461 | Rasch | Mar. 25, 1952 |
| 2,608,016 | Shipley | Aug. 26, 1952 |
| 2,616,205 | Mason | Nov. 4, 1952 |
| 2,685,145 | Dean | Aug. 3, 1954 |